United States Patent
Schmidt et al.

(10) Patent No.: US 6,599,355 B1
(45) Date of Patent: Jul. 29, 2003

(54) INTERFERENCE PIGMENTS WITH GREAT COLOR STRENGTH

(75) Inventors: Christoph Schmidt, Kriftel (DE); Klaus Bernhardt, Gross-Umstadt (DE); Sabine Schoen, Darmstadt (DE); Dieter Heinz, Heppenheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/111,574

(22) PCT Filed: Oct. 27, 2000

(86) PCT No.: PCT/EP00/10591

§ 371 (c)(1),
(2), (4) Date: Apr. 26, 2002

(87) PCT Pub. No.: WO01/30921

PCT Pub. Date: May 3, 2001

(30) Foreign Application Priority Data

Oct. 28, 1999 (DE) .......................... 199 51 871

(51) Int. Cl.⁷ .............................................. C04B 14/20
(52) U.S. Cl. ....................................... 106/417; 106/415
(58) Field of Search ................................ 106/415, 417

(56) References Cited

FOREIGN PATENT DOCUMENTS

| EP | 0 211 351 | 2/1987 |
|----|-----------|--------|
| EP | 0 753 545 | 1/1997 |
| WO | WO 93 12182 | 6/1993 |
| WO | WO 94 13489 | 6/1994 |
| WO | WO 00 43456 | 7/2000 |
| WO | WO 97 43348 | 7/2000 |

*Primary Examiner*—C. Melissa Koslow
*Assistant Examiner*—Shalie Manlove
(74) *Attorney, Agent, or Firm*—Millen White Zelano & Branigan, P.C.

(57) ABSTRACT

The invention relates to interference pigments with a great color strength that are based on multicoated platelet-shaped substrates that have at least one series of layers from (A) a highly refractive coating that consists of a mixture of $TiO_2$ and $Fe_2O_3$ in ratio of 1:0.1 to 1:5 and optionally one or more metal oxides in amounts of $\leq 20\%$ by weight based on layer (A), (B) a colorless coating with a refractive index $n \leq 1.8$, (C) a colorless coating with a refractive index of n 1.8, (D) an absorptive coating with a refractive index of n 1.8, and optionally (E) an outer protective layer.

16 Claims, No Drawings

INTERFERENCE PIGMENTS WITH GREAT COLOR STRENGTH

The present invention relates to intensely coloured interference pigments based on multicoated platelet-shaped substrates.

Lustre or effect pigments are employed in many areas of industry, in particular in the area of automotive paints, decorative coatings, in surface coatings, printing inks and in cosmetic formulations.

Owing to their colour play, lustre pigments which exhibit an angle-dependent colour change between a number of interference colours are of particular interest for automotive paints and in counterfeiting-proof securities. Pigments of this type based on multicoated platelet-shaped substrates are disclosed in U.S. Pat. No. 4,434,010, JP H7-759, U.S. Pat. No. 3,438,796, U.S. Pat. No. 5,135,812, DE 44 05 494, DE 44 37 753, DE 195 16 181 and DE 195 15 988.

Lustre pigments based on transparent platelet-shaped substrates which do not have a "hard" metallic lustre are the subject-matter of WO 93/12182. Mica platelets are covered with a high-refractive-index metal-oxide layer, such as, for example, $TiO_2$, and a non-selectively absorbing layer. Depending on the $TiO_2$ layer thickness, these pigments exhibit a certain interference colour when viewed perpendicularly which becomes weaker and weaker with increasingly oblique viewing angle and finally drops off to grey or black. The interference colour does not change, but a decrease in colour saturation is observed.

JP 1992/93206 claims lustre pigments based on glass platelets or mica particles which are covered With an opaque metal layer and alternating $SiO_2$ and $TiO_2$ layers.

EP 0 753 545 A2 discloses goniochromatic lustre pigments based on multi-coated, high-refractive-index, non-metallic, platelet-shaped substrates which are at least partially transparent to visible light, which pigments have at least one layer pack comprising a colourless, low-refractive-index coating and a reflective coating which absorbs selectively or non-selectively. The preparation process described in EP 0 753 545 A2 involves coating the pigment substrate by a CVD process in a fluidised-bed reactor. Here, the substrate, for example finely divided mica, is fluidised in a stream of an inert carrier gas and kept in motion. The reagents necessary for the formation of the oxide layers are supplied via the stream of inert gas or further inert-gas inlets. However, owing to the high density difference between the mica/pigment and the carrier gas, a significant problem in this process is uniform distribution of the solid particles and thus uniform coating. Accordingly, disadvantages of this invention are the technically very complex and expensive preparation process and the often difficult reproducibility of the pigments in the desired product quality.

Goniochromatic lustre pigments having a silicon-containing coating based on multicoated platelet-shaped metallic substrates are disclosed in EP 0 768 343 A2.

A common feature of the multilayered pigments known from the prior art is that they have inadequate tinting strength and comparatively low hiding power. Furthermore, the pigments are in some cases very difficult to prepare or reproduce.

The object of the present invention is to provide gold- and orange-red interference pigments having high tinting strength and high hiding power are distinguished by their advantageous applicational properties and at the same time can be prepared in a simple manner.

Surprisingly, gold- and orange-red pigments based on multicoated platelet-shaped substrates which have a certain arrangement of optically functional layers, giving particular optical effects, have now been found.

The intensely coloured interference pigments according to the invention are distinguished by their extraordinarily high chroma C ("tinting strength"), their very high hiding power and very strong lustre with glitter effect. In contrast to gold-coloured pearlescent pigments as disclosed, for example, in EP 0 211 351 B1, the gold-coloured interference pigments according to the invention exhibit significantly higher tinting strength and higher hiding power. The gold pigments according to the invention are an equivalent—and with respect to lustre and tinting strength—superior alternative to the known metal bronzes, in particular in gravure printing on textiles.

In contrast to the goniochromatic pigments from the prior art, the pigments according to the invention have only a slight angle-dependent colour effect, or none at all.

The invention thus relates to intensely coloured interference pigments based on multicoated platelet-shaped substrates which comprise at least one layer sequence comprising (A) a high-refractive-index coating consisting of a mixture of $TiO_2$ and $Fe_2O_3$ in a ratio of from 1:0.1 to 1:5, and optionally one or more metal oxides in amounts of $\leq 20\%$ by weight, based on the layer (A), (B) a colourless coating having a refractive index n of $\leq 1.8$, (C) a colourless coating having a refractive index n of $>1.8$, (D) an absorbent coating having a refractive index n of $>1.8$ and optionally (E) an outer protective layer.

The invention furthermore relates to the use of the pigments according to the invention in paints, coatings, printing inks, plastics, ceramic materials, glasses and cosmetic formulations, in particular in printing inks. The pigments according to the invention are furthermore also suitable for the preparation of pigment preparations and for the preparation of dry preparations, such as, for example, granules, chips, pellets, briquettes, etc. The dry preparations are particularly suitable for printing inks.

Suitable base substrates for the multilayered pigments according to the invention are on the one hand opaque platelet-shaped substrates and on the other hand transparent platelet-shaped substrates. Preferred sub-strates are phyllosilicates. Particularly suitable substrates are natural and/or synthetic mica, talc, kaolin, platelet-shaped iron oxides or aluminum oxides, glass platelets, $SiO_2$ platelets, $TiO_2$ platelets, graphite platelets, synthetic support-free platelets, liquid crystal polymers (LCPs), holographic pigments, BiOCl, metal platelets, such as, for example, aluminum platelets, platelets comprising aluminum bronzes, brass bronzes, zinc bronzes, titanium bronzes, or other comparable materials.

The size of the base substrates is not crucial per se and can be matched to the respective application. In general, the platelet-shaped substrates have a thickness of between 0.05 and 5 $\mu$m, in particular between 0.1 and 4.5 $\mu$m. The extension in the two other ranges is usually between 1 and 250 $\mu$m, preferably between 2 and 200 $\mu$m, and in particular between 5 and 60 $\mu$m.

The thickness of the individual layers of high (for example pseudobrookite) and low refractive index on the base substrate is essential for the optical properties of the pigment. For a pigment having, intense interference colours, the thickness of the individual layers must be set precisely with respect to one another.

If n is the refractive index of a thin layer and d is its thickness, the interference colour of this layer is determined by the product n·d (n·d=optical thickness). The colours arising in a film of this type in reflected light in the case of perpendicular light incidence arise from an amplification of the light having the wavelength $$\lambda = \frac{4}{2N-1} \cdot n \cdot d$$

and by attenuation of the light having the wavelength $$\lambda = \frac{2}{N} \cdot n \cdot d$$

where N is a positive integer.

The variation in the colour resulting in the case of increasing film thickness arises from the amplification or attenuation of certain wavelengths of the light by interference. If a plurality of layers in a multilayered pigment have the same optical thickness, the colour of the reflected light becomes more intense with increasing number of layers. Given a suitable choice of the layer thicknesses, however, it is also possible to obtain very attractive interference pigments with layers of different optical thickness. The thickness of the individual metal-oxide layers, independently of their refractive index, is generally from 5 to 600 nm, preferably from 10 to 500 nm, and in particular from 20 to 400 nm, depending on the area of application.

The interference pigments according to the invention have, in an alternating manner, a high-refractive-index coating (A) consisting of a mixture of $TiO_2$ and $FeO_3$, preferably pseudobrookite, in combination with a colourless low-refractive-index coating (B). Layer (C) preferably consists of $TiO_2$, $ZrO_2$, $SnO_2$, $Ce_2O_3$, BiOCl, or mixtures or combinations thereof. In the case where layer (C) comprises $TiO_2$, the $TiO_2$ is preferably in the rutile modification. Materials which are suitable for layer (D) are absorbent materials, such as metals, such as, for example, iron, tungsten, chromium, cobalt, nickel, copper, silver, gold, aluminum and alloys thereof, metal oxides, such as, for example, CoO, $Co_3O_4$, $Fe_2O_3$, $Fe_3O_4$, pseudobrookite, $VO_2$ and $V_2O_3$, metal sulfides, such as, for example, molybdenum sulfide, iron sulfide, tungsten sulfide, chromium sulfide, cobalt sulfide, nickel sulfide and mixtures of these sulfides. The absorbent layer (D) is preferably a layer of pseudobrookite or $Fe_2O_3$ or a mixture of pseudobrookite with $TiO_2$ or pseudobrodkite with $Fe_2O_3$. Layer (D) has a refractive index of n >1.8, in particular of n >2.0.

The pigments may comprise a plurality of identical or different combinations of layer packs, but the substrate is preferably covered by only one layer pack (A)+(B)+(C)+ (D). In order to intensify the tinting strength, the pigment according to the invention may comprise up to 4 layer packs, although the thickness of all layers on the substrate should not exceed 3 μm. An odd number of layers is preferably applied to the platelet-shaped substrate, with a high-refractive-index layer in both the innermost and outermost layer. Particular preference is given to a structure of four optical interference layers in the sequence (A) (B) (C) (D). A further colourless low-refractive-index layer (B*), which may be identical or different to layer (B), may be located between layers (C) and (D).

The high-refractive-index layer (A) preferably has a refractive index of n>1.8, in particular of n>2.0, and is a mixture of $TiO_2$ and $Fe_2O_3$, where the mixing ratio is from 1:0.1 to 1:5, in particular from 1:1 to 1:2.5. Layer (A) is preferably intensely coloured pseudobrookite. The thickness of layer (A) is from 10 to 300 nm, preferably from 15 to 250 nm and in particular from 20 to 200 nm.

In order to increase the tinting strength of layer (A), it is frequently advisable to admix one or more metal oxides, such as, for example, $Al_2O_3$, $Ce_2O_3$, $B_2O_3$, $ZrO_2$ or $SnO_2$, with the $TiO_2/Fe_2O_3$ mixture. The proportion of the further metal oxides in % by weight in addition to the $Fe_2O3/TiO_2$ mixture in layer (A) should be not more than 20% by weight, prefemore than 10% by weight.

In the case where layer (D) is likewise a layer comprising a $TiO_2Fe_2O_3$ mixture, the addition of one or more metal oxides, such as, for example, $Al_2O_3$, $Ce_2O_3$, $B_2O_3$, $ZrO_2$ or $SnO_2$, in a mounts of not more than 20% by weight, based on layer (D), is likewise advisable in order to increase the tinting strength.

Colourless, low-refractive-index materials which are suitable for coating (B) are preferably metal oxides or the corresponding oxide hydrates, such as, for example, $SiO_2$, $Al_2O_3$, AlO(OH), $B_2O_3$, $MgF_2$, $MgSiO_3$ or a mixture of the said metal oxides. The thickness of layer (B) is from 10 to 600 in m, preferably from 20 to 500 nm and in particular from 20 to 400 nm.

The coating of the substrates with a high-refractive-index pseudobrookite layer, a low-refractive-index layer (B), a high-refractive-index layer (C) and an absorbent layer (D) results in the formation of interference pigments whose color, lustre and hiding power can be varied within broad limits.

Particularly preferred coloured pigments have the following layer sequences:

substrate+$TiFe_2O_5$ (A)+$SiO_2$ (B)+$TiO_2$ (C)+$Fe_2O_3/tiO_2$ (D)

substrate+$TiFe_2O_5$ (A)+$SiO_2$ (B)+$TiO_2$ (C)+$Fe_2O_3$ (D)

substrate+$TiFe_2O_5$ (A)+$SiO_2$ (B)+$TiO_2$ (C)+$TiFe_2O_5$ (D)

substrate+$TiFe_2O_5$ (A)+$SiO_2$ (B)+$TiO_2$ (C)+$SiO_2$ (B*)+ $TiFe_2O_5$ (D)

substrate+$TiFe_2O_5$ (A)+$SiO_2$ (B)+$TiO_2$ (C)+$SiO_2$ (B*)+ $Fe_2O3/TiO_2$ (D)

The pigments according to the invention can easily be prepared by the production of a plurality of high-and low-refractive-index interference layers with precisely defined thickness and a smooth surface on the finely divided, platelet-shaped substrates.

The metal-oxide layers are preferably applied by wet-chemical methods, it being possible to use the wet-chemical coating methods developed for the production of pearlescent pigments. Methods of this type are described, for example, in DE 14 67 468, DE 19 59 988, DE 20 09 566, DE 22 14 545, DE 22 15,191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or in further patent documents and other publications known to the person skilled in the art.

In the case of wet coating, the substrate particles are suspended in water, and one or more hydrolysable metal salts are added at a pH which is suitable for hydrolysis, this pH being selected in such a way that the metal oxides or metal oxide hydrates are precipitated directly onto the platelets without secondary precipitations occurring. The pH is usually kept constant by simultaneous metering-in of a base and/or acid. The pigments are subsequently separated off, washed and dried and optionally ignited, it being possible for the ignition temperature to be optimised with respect to the coating present in each case. In general, the ignition temperatures are between 250 and 1000° C., preferably between 350 and 900° C. If desired, the pigments can be separated off, dried and optionally ignited after application of individual coatings and then re-suspended for precipitation of the further layers.

The coating can furthermore also be carried out in a fluidised-bed reactor by gas-phase coating, it being possible, for example, correspondingly to use the processes proposed in EP 0 045 851 and EP 0 106 235 for the production of pearlescent pigments.

The hue of the pigments can be varied within broad limits by selecting different covering amounts or layer thicknesses resulting therefrom. The fine tuning for a certain hue can be achieved beyond the pure choice of amount by approaching the desired colour under visual or measurement technology control.

In order to increase the light, water and weather stability, it is frequently advisable, depending on the area of application, to subject the finished pigment to post-coating or post-treatment. Suitable post-coatings or post-treatments are, for example, the processes described in German Patent 22 15 191, DE-A 31 51 354, DE-A 32 35 017 or DE-A 33 34 598. This post-coating (layer E) further increases the chemical stability or simplifies handling of the pigment, in particular incorporation into various media.

The pigments according to the invention are compatible with a large number of colour systems, preferably from the area of paints, coatings and printing inks. For the production of printing inks, a large number of binders, in particular water-soluble grades, is suitable, as marketed, for example, by BASF, Marabu, Pröil, Sericol, Hartmann, Gebr. Schmidt, Sicpa, Aarberg, Siegberg, GSB-Wahl, Follmann, Ruco or Coates Screen INKS GmbH. The printing inks may be water-based or solvent-based. The pigments are furthermore also suitable for the laser marking of paper and plastics, and for applications in the agricultural sector, for example for greenhouse sheeting, and, for example, for the colouring of tent awnings.

The invention thus also relates to the use of the pigments in formulations such as paints, printing inks, security printing inks, surface coatings, plastics, ceramic materials, glasses and in cosmetic formulations.

It goes without saying that, for the various applications, the multilayered pigments can also advantageously be used in the form of a mixture with organic dyes, organic pigments or other pigments, such as, for example, transparent white, coloured and black pigments having high hiding power, and with platelet-shaped iron oxides, organic pigments, holographic pigments, LCPs (liquid crystal polymers) and conventional transparent, coloured and black lustre pigments based on metal oxide-coated mica and $SiO_2$ platelets, etc. The multilayered pigments can be mixed with commercially available pigments and fillers in any ratio.

The pigments according to the invention are furthermore suitable for the production of flow able pigment preparations and dry preparations, in particular for printing inks, comprising one or more pigments according to the invention, binders and optionally one or more additives.

The following examples are intended to explain the invention in greater detail, but without restricting it.

EXAMPLES

Example 1

100 g of mica having a particle size of 10–60 μm are heated to 75° C. in 2 l of demineralised water. When this temperature has been reached, a solution of 130.5 g of $FeCl_3 \times 6\ H_2O$, 46.5 g of $TiCl_4$ and 11.6 g of $AlCl_3 \times 6\ H_2O$ in 84.3 g of demineralised water is slowly metered in with vigorous stirring. The pH is kept constant at pH 2.6 by means of 32% sodium hydroxide solution. After this solution has been added, the mixture is stirred for a further approximately 15 minutes. The pH is subsequently raised to pH=7.5 by means of 32% sodium hydroxide solution, and 431 g of sodium water-glass solution (13.5% of $SiO_2$) are slowly metered in at this pH. The pH is then lowered to 2.0 by means of 10% hydrochloric acid, the mixture is stirred for a further 15 minutes, and 393 g of TiCl4 solution (370 g of TiCl4/l) are metered in. During this addition, the pH is kept constant by means of 32% sodium hydroxide solution. The pH is subsequently raised to 2.6 by means of 32% sodium hydroxide solution, and a solution consisting of 34 g of $FeCl_3 \times 6\ H_2O$ and 49 g of demineralised water is slowly metered in. The pH is kept constant at pH=2.6 by means of 32% sodium hydroxide solution. After this solution has been added, the mixture is stirred for a further approximately 15 minutes. The pH is subsequently raised to pH=5.0 by means of 32% sodium hydroxide solution, and the mixture is stirred for a further 15 minutes.

The pigment is filtered off, washed with demineralised water and dried at 110° C. for 16 hours. Finally, the pigment is ignited at 850° C. for 30 minutes, giving a gold.pigment having an intense colour, high hiding power and strong lustre.

Example 2

100 g of mica having a particle size of 10–60 μm are heated to 75° C. in 2 l of demineralised water. When this temperature has been reached, a solution of 121.5 g of $FeCl_3 \times 6\ H_2O$, 43.3 g of $TiCl_4$ and 10.6 g of $AlCl_3 \times 6\ H_2O$ in 77.0 g of demineralised water is slowly metered in with vigorous stirring. The pH is kept constant at 2.6 by means of 32% sodium hydroxide solution. After this solution has been added, the mixture is stirred for a further approximately 15 minutes. The pH is subsequently raised to pH 7.5 by means of 32% sodium hydroxide solution, and 394 g of sodium water-glass solution (13.5% of $SiO_2$) are slowly metered in at this pH. The pH is then lowered to 2.0 by means of 10% hydrochloric acid. The mixture is stirred for a further 15 minutes, and then 314 g of $TiCl_4$ solution (370 g of $TiCl_4$/l) are metered in. During this addition, the pH is kept constant by means of 32% sodium hydroxide solution. The pH is subsequently raised to 2.6 by means of 32% sodium hydroxide solution, and a solution of about 48.6 g of $FeCl_3 \times 6\ H_2O$, 18.6 g of $TiCl_4$ and 4.0 g of $AlCl_3 \times 6\ H_2O$ in 31.4 g of demineralised water is slowly metered in. The pH is kept constant at 2.6 by means of 32% sodium hydroxide solution. After this solution has been added, the mixture is stirred for a further approximately 15 minutes. The pH is subsequently raised to pH 5.0 by means of 32% sodium hydroxide solution, and the mixture is stirred for a further 15 minutes. The pigment is filtered off, washed with 15 l of demineralised water and dried at 110° C. for 16 hours.

The pigment is subsequently ignited at 850° C. for 30 minutes, giving a gold pigment having an intense colour, high hiding power and strong lustre.

Example 3

100 g of mica having a particle size of 10–60 μm are heated to 75° C. in 2 l of demineralised water. When this temperature has been reached, a solution of 121.5 g of $FeCl_3 \times 6\ H_2O$, 43.3 g of $TiCl_4$ and 10.6 g of $AlCl_3 \times 6\ H_2O$ in 77.0 g of demineralised water is slowly metered in with vigorous stirring. The pH is kept constant at pH=2.6 by means of 32% sodium hydroxide solution. After this solution has been added, the mixture is stirred for a further approximately 15 minutes. The pH is subsequently raised to pH=7.5 by means of 32% sodium hydroxide solution, and 394 g of sodium water-glass solution (13.5% of $SiO_2$) are slowly metered in at this pH. The pH is then lowered to 2.0 by means of 10% hydrochloric acid, the mixture is stirred for a further 15 minutes, and 235 g of $TiCl_4$ solution (370 g of TiCl4/l) are slowly metered in. During this addition, the pH is kept constant by means of 32% sodium hydroxide solution. 22 g of sodium water-glass solution (13.5% of $SiO_2$) are subsequently metered in slowly at pH=2.0, and the mixture is stirred for a further 15 minutes. The pH is then raised to 2.6 by means of 32% sodium hydroxide solution, the mixture is stirred for a further 15 minutes, and 65.3 g of $FeCl_3 \times 6\ H_2O$, 23.3 g of $TiCl_4$ and 5.8 g of $AlCl_3 \times 6\ H^2O$ in 42.1 g of demineralised water are slowly metered in.

The pH is kept constant at 2.6 by means of 32% sodium hydroxide solution. After this solution has been added, the mixture is stirred for a further approximately 15 minutes. The pH is subsequently raised to pH 5.0 by means of 32% sodium hydroxide solution, and the mixture is stirred for a further 15 minutes. The pigment is filtered off, washed with demineralised water and dried at 11° C. for 16 hours.

The pigment is subsequently ignited at 850° C. for 30 minutes, giving a gold pigment having an intense colour, high hiding power and strong lustre.

The following table shows the coloristic data of the pigments according to the invention compared with a pearlescent gold pigment and a gold-bronze pigment which correspond to the prior art (Phyma-Lab values, measured on a black background in specular reflection 22.5°/22.5°):

|  | L | a | b | h | C | Hiding power |
|---|---|---|---|---|---|---|
| Iriodin ® 306 gold-coloured pearlescent pigment ($TiO_2/Fe_2O_3$ mica pigment having a particle size of 10–60 μm from Merck KGaA) | 66.0 | 1.5 | 20.6 | 85.7 | 20.7 | 32.4 |
| Gold interference pigment Ex. 1 | 77.7 | 1.4 | 32.2 | 87.5 | 32.2 | 52.5 |
| Gold interference pigment Ex. 2 | 80 | −0.9 | 34.0 | 91.5 | 34.0 | 62.7 |
| Gold interference pigment Ex. 3 | 75.0 | −1.2 | 28.3 | 92.5 | 28.3 | 47.8 |
| Metal gold-bronze (Eckart, rich bleach gold), comparative pigment | 67.1 | 1.5 | 15.4 | 84.8 | 15.5 | 51.5 |

The coloristic date clearly demonstrate the advantages over the comparative pigments, in the b value and the chroma C.

Use Examples

Example A: Flexographic Printing
Binder: Kustom Kote 9000/USA, water-based
  Thinner: water
  Ink preparation:
  a) Pigment from Example 2 (22.9% ) prewetting Byk 348 (0.6% )
    Viscosity: 40 sec, 4 mm Erichsen cup, RT
  b) Iriodine® 306 (22.1% ), prewetting Byk 348 (0.6% )
    Viscosity 41 sec., 4 mm Erichsen cup, RT The pigments are printed onto maft-black art paper (offset) from an Anilox ceramic cylinder (24 ccm/m²) via a cliché for overprint varnishing. The pigment according to the invention from Example 2 exhibited a significantly stronger colour and lustre effect than the comparative pigment (Iriodin® 306). The coloristic measurement values of the printed surface confirm this result:

|  | L | a | b |
|---|---|---|---|
| Iriodin ® 306 | 35.4 | 0.1 | 5.7 |
| Pigment from Example 2 | 50.9 | −0.8 | 13.6 |
| Difference (%) | +14 | n.r. | +138 |

Example B: Paint Application

Preparation of the painted metal sheets:
Paint: Herberts basecoat 419982
Pigmentation: 5%
Dry-layer thickness: 15 μm
Spray gun: Sprimag S 233, nozzle diameter: 1.5 mm
Spray pressure: 4 bar
Nozzle-substrate separation: 27 cm The spray painting of aluminum test sheets with pigment from Example 2 and the comparative pigment Iriodin 306® gives the following coloristic values:

|  | L | a | b | C |
|---|---|---|---|---|
| White background | | | | |
| Iriodin ® 306 | 72.7 | 9.0 | 51.3 | |
| Pigment from Example 2 | 79.9 | 2.4 | 57.6 | |
| Black background | | | | |
| Iriodin ® 306 | 68.3 | 4.2 | 44.4 | 44.6 |
| Pigment from Example 2 (Measurement: Minolta CR 300) | 78.3 | 0.3 | 54.1 | 54.1 |

The pigment from Example 2 exhibits significantly greater lightness L and chroma C than the comparative pigment.

What is claimed is:

1. Intensely coloured interference pigments based on multicoated platelet-shaped substrates which comprise at least one layer sequence comprising
    (A) a high-refractive-index coating consisting of a mixture of $TiO_2$ and $Fe_2O_3$ in a ratio of from 1:0.1 to 1:5, and optionally one or more mental oxides in amounts of ≦20% by weight, based on the layer (A),
    (B) a colourless coating having a refractive index n of ≦1.8,
    (C) a colourless coating having a refractive index n of >1.8,
    (D) an absorbent coating having a refractive index of n of >1.8 and optionally
    (E) an outer protective layer.

2. Interference pigments according to claim 1, wherein the platelet-shaped substrates are natural or synthetic mica, glass platelets, $Al_2O_3$ platelets, $SiO_2$ platelets or $TiO_2$ platelets.

3. Interference pigments according to claim 1, wherein the layer (A) consists of pseudobrookite.

4. Interference pigments according To claim 1, wherein the layer (B) essentially consists of one or more metal oxides.

5. Interference pigments according to claim 1, wherein the layer (B) essentially consists of silicon dioxide, aluminum oxide, magnesium fluoride or mixtures thereof.

6. Interference pigments according to claim 1, wherein the layer (A) comprises $Al_2O_3$, $Ce_2O_3$ and/or $B_2O_3$ as further metal oxide.

7. Interference pigments according to claim 1, wherein they have up to four times the layer sequence (A)+(B)+(C)+(D).

8. Interference pigments according to claim 1, wherein they have only one layer sequence (A)+(B)+(C)+(D).

9. Interference pigments according to claim 1, wherein they contain a further colourless, low-retractive-index layer (B*), which may be identical or different to layer (B), between layers (C) and (D).

10. Interference pigments according to claim 1, wherein they have an outer protective layer (E) in order to increase the light, temperature and weather stability.

11. Process for the preparation of the interference pigments according to claim 1, wherein the coating of the substrates is carried out wet-chemically by hydrolytic decomposition of metal salts in aqueous medium.

12. Pigment preparations comprising one or more binders, optionally one or more additives, and one or more interference pigments according to claim 1.

13. Dry preparations comprising intensely coloured interference pigments according to claim 1.

14. A paint a coating, a printing ink, a security printing ink, a plastic, a ceramic material, a glass or cosmetic formulation composing an interference pigment according to claim 1.

15. A process for making a pigment preparation or a dry preparation, comprising incorporating an interference pigment according to claim 1.

16. A pellet, a granule, a chip or braitte comprising an interference pigment according to claim 1.

* * * * *

UNITED STATES PATENT AND TRADEMARK OFFICE
CERTIFICATE OF CORRECTION

PATENT NO. : 6,599,355 B1
DATED : July 29, 2003
INVENTOR(S) : Christoph Schmidt et al.

It is certified that error appears in the above-identified patent and that said Letters Patent is hereby corrected as shown below:

Title page,
Item [54], Title, should read -- INTENSELY COLOURED INTERFERENCE PIGMENTS --.

Column 8,
Line 49, "mental oxides" should read -- metal oxides --.
Lines 50 and 52, "$\leqq$" should read -- $\leq$ --.
Line 65, "according To" should read -- according to --.

Column 9,
Line 13, "low-retractive-index" should read -- low-refractive-index --.

Column 10,
Line 9, "A paint a coating" should read -- A paint, a coating --.
Line 11, "formulation composing" should read -- formulation comprising --.
Line 17, "a chip or a braitte" should read -- a chip or a briquette --.

Signed and Sealed this

Fifth Day of July, 2005

JON W. DUDAS
*Director of the United States Patent and Trademark Office*